Patented Oct. 16, 1934

1,977,221

UNITED STATES PATENT OFFICE 1,977,221

PAPER MANUFACTURE

James A. Yates, Berlin, N. H., assignor to Brown Company, Berlin, N. H., a corporation of Maine No Drawing. Application November 5, 1932, Serial No. 641,463

14 Claims. (Cl. 91—68)

This invention relates to the manufacture of papers having special characteristics, such as high wet strength, softness, and pliability by virtue of the presence therein of ingredients which impart these properties to the paper.

It has been established that the presence of regenerated cellulose in paper makes for the enhancement of the strength, especially the wet strength, of the paper. So, too, it has been established that the presence of polyhydric alcohols, such as glycerine, ethylene glycol, or the like, in the paper is accompanied by the development of high softness and pliability in the paper. Indeed, when paper is to serve as toweling, wiping, dusting, cleaning, or mopping material, it has been found desirable to have regenerated cellulose and glycerine coexist in the paper, as the paper may be made to assume the feel, limpness and other characteristics of cloth.

I have found that in making papers of the foregoing character, it is highly advantageous to treat the paper with glycerine or other polyhydric alcohols containing dissolved therein a suitable oxidant, preferably a gaseous one, such as chlorine. Glycerine, for example, dissolves 1.95% by weight of chlorine at 25° C. While such a glycerine solution of chlorine might be advantageously used in connection with various kinds of paper to be glycerinated, it is of especial value in treating papers charged with regenerated cellulose derived from viscose. Such latter papers are apt to be malodorous or potentially malodorous by virtue of the presence therein of residual sulphide impurities of an odor-emitting character, even though steps are taken to regenerate the cellulose completely from the viscose and/or to add chemicals such as ammonium carbonate along with the viscose so as to react upon the sulphide impurities and thereby to form hydrogen sulphide or other volatile sulphur compounds which are expelled during the drying or redrying of the paper, depending upon whether the viscose is added in the course of paper manufacture or to a prefabricated, dried paper. By treating a paper containing regenerated cellulose with glycerine or equivalent polyhydric alcoholic softening agent containing chlorine or other oxidant dissolved therein, it is possible not only to realize paper which is completely and permanently free from malodors, but to attain other advantages which will presently be noted. Apparently, the chlorine or other oxidant serves to oxidize the residual sulphide impurities present in the paper into colloidal sulphur, which is odorless. Moreover, when commercial glycerine is employed, such malodorous impurities as are invariably present in such glycerine are oxidized and rendered non-odoriferous by the chlorine or other oxidant added thereto.

It is of course possible to fabricate papers containing regenerated cellulose by adding viscose to the papermaking stock at any suitable stage of paper manufacture, all the way from the bulk papermaking stock in the beater engine to, and including, the dried sheet of paper delivered from the papermaking machine. The regeneration of the cellulose from the viscose may be effected by the use of suitable cellulose-regenerating chemicals, such as acids, acid salts, and the like, and/or by the heat applied during the drying and/or redrying of the viscose-treated paper. If desired, chemicals, such as boric acid, may be added to the viscose in amount short of gelling or coagulating the viscose, whereupon, when the viscose is applied to the paper and the paper is then dried at elevated temperature, regeneration of the cellulose may be promoted by the boric acid or equivalent chemical. The treatment of the paper with glycerine containing chlorine or other oxidant dissolved therein is performed after the paper has undergone treatment with the viscose and preferably after regeneration of the cellulose from the viscose has been effected. While such treatment may be applied to the freshly formed, wet web of paper as it is traveling on the papermaking machine, it is preferable to apply such treatment to a prefabricated, dried sheet of paper containing the regenerated cellulose as it is being delivered progressively from the dry end of the papermaking machine. Such latter preferred procedure means that there need be no corrosion problem to contend with on the papermaking machine. Again, since the glycerine may be used in a substantially anhydrous condition, there need be no redrying of the paper at elevated temperature, in consequence of which the chlorine or other gaseous oxidant, rather than being promptly expelled from the paper under elevated-temperature-drying conditions, will remain in the glycerine for a substantial period of time, and thus ensure a complete destruction of malodors in the paper.

A preferred procedure in accordance with my invention will now be given. A prefabricated, dried sheet of paper containing, say, about ½% to 2% of viscose-derived, regenerated cellulose may be progressively delivered from the dry end of a papermaking machine into the nip of a pair of squeeze rolls, the lower one of which is progressively supplied with a glycerine solution of chlorine distributed uniformly over a portion of its periphery. Thus, the lower squeeze roll may be caused to rotate partially submerged in a bath of glycerine of substantially 100% strength, containing chlorine dissolved therein up to the saturation point. The lower roll may be positively driven, whereas the upper roll may be driven by the paper sheet. In some instances, the treatment with glycerine is best accomplished on a rewinder, that is, on a machine whose speed can be regulated independently of the speed of the papermaking machine. In such case, the rewinder may be provided with squeeze rolls, as already described, and the amount or glycerine picked up by the paper may be readily and accurately regulated by adjusting the speed of the lower squeeze roll, which dips into the bath of glycerine. It is preferable to drive the lower squeeze roll positively, by means of a variable speed mechanism, such as a "Reeves" drive, and to permit the upper roll to be driven only by the friction of the paper sheet. The squeeze rolls may be rubber-covered so as to avoid corrosion difficulties and to promote a forcible penetration of the glycerine solution into and throughout the paper. The bath of glycerine may be heated, say, to a temperature of about 50° to 55° C., as the viscosity of glycerine is sharply reduced by temperature increase and its influx into and throughout the paper sheet greatly promoted. To be sure, the solubility of chlorine in glycerine falls with a rise in temperature of the glycerine, but under the particular elevated temperature conditions mentioned, not only is the glycerine quite fluent, but the solubility of chlorine therein is sufficient to ensure a complete destruction of the malodorous impurities present in the paper. The rate of rotation of the lower squeeze roll may be controlled to leave the desired amount of glycerine in the paper. Thus, when paper towels are in view, the amount of glycerine associated with the paper may be much less than in those cases when the paper is to serve for dusting or cleaning purposes. For instance, when the paper is to serve for the absorption and removal of oil from machines, or of ink from printing or engraving plates or rolls, the glycerine content of the paper may be made as high as 30%, or even higher.

The use of glycerine or similar media as a vehicle for carying an oxidant, such as chlorine or hydrogen peroxide, into a paper sheet, as hereinbefore described, is an economical expedient, as it involves only a single treatment of the paper to accomplish the desired ends of destroying malodors and of softening the paper; and it does away with the need of equipment such as gas chambers, when the highly effective gaseous oxidants, hereinbefore mentioned, are employed. Again, wastage or leakage of the gaseous oxidant, such as ensues when the paper is led through a gas chamber, is eliminated.

The foregoing example is merely illustrative of a preferred application of my invention, for the principles thereof may be applied in connection with articles other than paper, made up at least in part with regenerated cellulose derived from viscose.

Thus, in making fabrics or other articles treated with viscose and even in making cellophane, it may be advantageous to perform a treatment with a glycerine solution of chlorine or other suitable oxidant. Such oxidants as hypochlorites, either acid or alkaline in reaction, or peroxides, may be added to the glycerine, although I prefer to use chlorine, because of its relatively low cost and high effectiveness.

I claim:

1. A process which comprises treating an article made up at least in part with viscose-derived, regenerated cellulose with a substantially anhydrous, polyhydric alcohol containing dissolved oxidant.

2. A process which comprises treating an article made up at least in part with viscose-derived, regenerated cellulose with substantially anhydrous glycerine containing dissolved oxidant.

3. A process which comprises treating an article made up at least in part with viscose-derived, regenerated cellulose with substantially anhydrous glycerine containing dissolved gaseous oxidant.

4. A process which comprises treating an article made up at least in part with viscose-derived, regenerated cellulose with substantially anhydrous glycerine containing dissolved chlorine.

5. A process which comprises treating prefabricated, dried paper containing viscose-derived, regenerated cellulose with substantially anhydrous glycerine containing dissolved chlorine.

6. A process which comprises treating prefabricated, dried paper containing viscose-derived, regenerated cellulose with substantially anhydrous glycerine at about 50° to 55° C. containing dissolved chlorine.

7. A process which comprises progressively associating viscose with paper at any suitable stage of paper fabrication, and progressively treating the paper with substantially anhydrous glycerine containing dissolved oxidant.

8. A process which comprises progressively associating viscose with paper at any suitable stage of paper fabrication, and progressively treating the paper with substantially anhydrous glycerine containing dissolved gaseous oxidant.

9. A process which comprises progressively associating viscose with paper at any suitable stage of paper fabrication, and progressively treating the paper with substantially anhydrous glycerine containing dissolved chlorine.

10. A process which comprises squeezing into and throughout a prefabricated, dried sheet of proper containing viscose-derived, regenerated cellulose substantially 100% glycerine containing dissolved oxidant.

11. A process which comprises squeezing into and throughout a prefabricated, dried sheet of paper containing viscose-derived, regenerated cellulose substantially 100% glycerine containing dissolved gaseous oxidant.

12. A process which comprises squeezing into a prefabricated, dried sheet of paper containing viscose-derived, regenerated cellulose substantially 100% glycerine containing dissolved chlorine.

13. A process which comprises associating with paper not more than ½% to 2% of regenerated cellulose in the form of viscose, thereby leaving residual pores and interstices in the paper, regenerating the cellulose from the viscose in the paper, and squeezing into the dried paper up to about 30% of substantially anhydrous glycerine containing chlorine dissolved therein practically up to the saturation point.

14. A process which comprises associating with paper not more than ½% to 2% of regenerated cellulose in the form of viscose, thereby leaving residual pores and interstices in the paper, regenerating the cellulose from the viscose in the paper, and squeezing into the dried paper up to about 30% of substantially anhydrous glycerine at a temperature of about 50° to 55° C., containing chlorine dissolved therein practically up to the saturation point at such temperature.

JAMES A. YATES.